United States Patent [19]

Kobayashi et al.

[11] 4,098,689

[45] Jul. 4, 1978

[54] METHOD OF TREATING WASTE WATER WITH ACTIVATED SLUDGE

[75] Inventors: Yasushi Kobayashi; Minoru Iwata, both of Himeji; Sadao Yoshida, Ichihara; Hisashi Akatsuka, Himeji, all of Japan

[73] Assignee: Idemitsu Kosan Company, Ltd., Tokyo, Japan

[21] Appl. No.: 729,173

[22] Filed: Oct. 4, 1976

Related U.S. Application Data

[63] Continuation-in-part of Ser. No. 592,948, Jul. 3, 1975, abandoned.

[30] Foreign Application Priority Data

Jul. 5, 1974 [JP] Japan .................................. 49-76481

[51] Int. Cl.² .......................... C02C 1/06; C02C 5/10

[52] U.S. Cl. ...................................... 210/15; 210/18; 210/51

[58] Field of Search ........................... 210/2–9, 210/11, 15, 18, 42 R, 51–53

[56] References Cited

U.S. PATENT DOCUMENTS

| 191,853 | 6/1877 | Hille | 210/54 |
| 3,152,983 | 10/1964 | Davis et al. | 210/11 |
| 3,423,309 | 1/1969 | Albertson | 210/5 |
| 3,480,144 | 11/1969 | Barth et al. | 210/4 |
| 3,801,499 | 4/1974 | Luck | 210/11 |
| 3,915,853 | 10/1975 | Luck | 210/51 |

Primary Examiner—Charles N. Hart
Assistant Examiner—Peter A. Hruskoci
Attorney, Agent, or Firm—Flynn & Frishauf

[57] ABSTRACT

On treating a waste water with activated sludge, an appropriate amount of sea water is added to the waste water.

8 Claims, 4 Drawing Figures

ADD SEA WATER TO MAKE A CONCENTRATION OF TOTAL SALT IN RAW WATER 0.30wt%

ADD SEA WATER TO MAKE A CONCENTRATION OF TOTAL SALT IN RAW WATER 0.30 wt%

ADD SEA WATER TO MAKE A CONCENTRATION OF TOTAL SALT IN RAW WATER 0.33%

ADD SEA WATER TO MAKE A CONCENTRATION OF TOTAL SALT IN RAW WATER 0.25 wt%

METHOD OF TREATING WASTE WATER WITH ACTIVATED SLUDGE

RELATED APPLICATION

This application is a continuation-in-part of our co-pending application Ser. No. 592,948 filed on July 3, 1975 now abandoned.

This application is related to our application Ser. No. 590,061 filed on June 25, 1975.

BACKGROUND OF THE INVENTION (a) Field of the Invention

The present invention relates to an improved method of treating a waste water with activated sludge. More specifically, an appropriate amount of sea water is added to the waste water in the method.

(b) Description of the Prior Art

Activated sludge has been used for treating various types of waste water. It has been known that the activated-sludge method has such disadvantages as a requirement of a long time for coagulation and separation of the activated sludge in a settling tank, and lowering of coagulation and sedimentation depending on conditions of the activated sludge. In order to overcome these disadvantages, use of various types of coagulants has been proposed. However, available coagulants composed mainly of inorganic or organic compounds are not satisfactory, because of increased accumulation of metals (such as Fe, Al, etc.) in the activated sludge, difficulty of storage, and so on.

It is an object of this invention, therefore, to provide an improved method for treating a waste water with activated sludge.

SUMMARY OF THE INVENTION

In accordance with the present invention, an appropriate amount of sea water is charged to a waste water at a specific stage during operation, in a process employing an activated sludge. As a consequence, an excellent reduction of the Biological Oxygen Demand (BOD) value in a treated water is obtained.

The method of the present invention is preferably applicable to treatment of an oil-containing waste water.

DETAILED DESCRIPTION OF THE INVENTION

Figure 1:
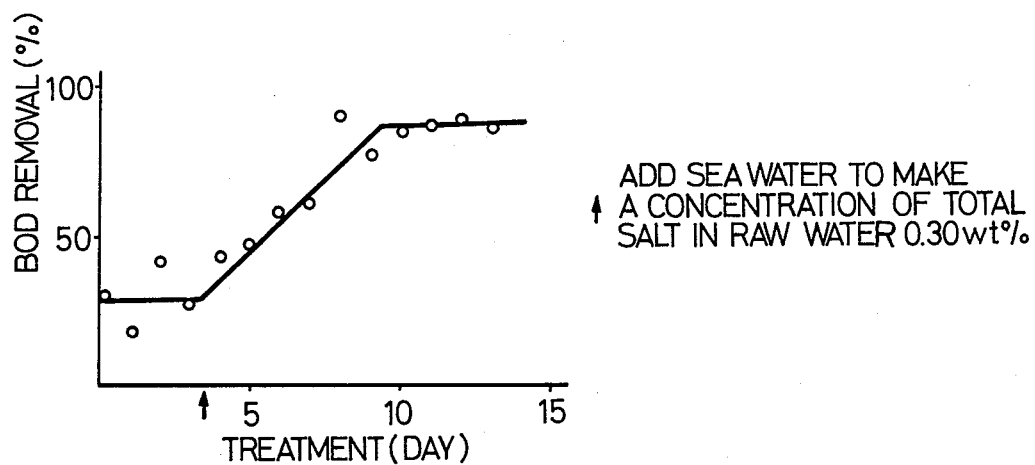
FIGS. 1 and 2 illustrate the effect of feeding of sea water on removal rate of BOD.

The method of the present invention comprises feeding a sea water to a raw water (i.e. a waste water) in operating an activated sludge process for treating waste water.

Feeding of a sea water to a raw water can be made either before the raw water is introduced into an aeration tank or directly into the aeration tank.

In the present invention three particular embodiments of feeding of a sea water are included. That is, (1) an appropriate amount of sea water is fed to a raw water continuously during operation, (2) a sea water is fed to a raw water intermittently at different feeding rates, and (3) an appropriate amount of sea water is fed to a raw water intermittently during operation, of the activated sludge process. In these feeding methods, embodiments (2) and (3) are preferable.

In case the sea water is added continuously during operation, the amount of sea water added to a raw water should be determined by considering various factors such as kind of a raw water, and total salt concentration in a raw water.

In case the sea water is added according to embodiments (2) or (3) intermittently, the following operation is followed. Treatment of a raw water is carried out by feeding a sea water to a raw water in an amount to provide a total salt concentration range from about 0.3 to about 0.5 weight percent at the start of the operation. The treatment is continued at this state for a while. Feeding of sea water is stopped or decreased when the removal rate of BOD in a treated water begins to fall and the treatment is carried out at this state. Then, the feeding of sea water is resumed or increased again when the total salt concentration in the raw water is reduced to one half or less of the total salt concentration at a steady state of the treatment. This is done repeatedly during the treatment of a raw water in an activated sludge process.

In performing the present invention, operative conditions should be determined by considering parameters including the kind of raw water, concentration of an activated sludge, and amounts of raw water to be treated. When the salt concentration of a waste water is low, feeding of sea water is made to provide a concentration range from 0.3 to 0.5 weight percent of total salt concentration (calculated as NaCl) after feeding of the sea water to the waste water. Furthermore, when the initial salt concentration of the waste water is high, efficiency of treating a waste water can also be improved by feeding sea water. However, in general, the salt concentration of a raw water after feeding of sea water should be kept within the range described above. When the total salt concentration exceeds about 0.5 weight percent, such facts as adverse effect upon microorganisms become apparent. Accordingly, the treatment of a raw water is carried out preferably by feeding sea water in an amount to provide a total salt concentration range from about 0.3 to about 0.5 weight percent.

Available coagulants can be employed together with sea water, if desired.

Upon practicing the present invention, typical conditions are as follows: the rate of introducing a raw water is from about 50 to about 140 m³/hr., the aeration tank capacity is 1000 m³, and the concentration of the activated sludge in the aeration tank is from about 1000 to about 8000 parts per million (ppm), more preferably 2000–6000 ppm.

It is well known that sea water contains various salts. The composition of a typical sea water is shown in Table 1.

Table 1

| | |
|---|---|
| NaCl | 77.758% |
| $MgCl_2$ | 10.878% |
| $MgSO_4$ | 4.737% |
| $CaCl_2$ | 3.600% |
| $K_2SO_4$ | 2.465% |
| $CaCO_3$ | 0.345% |
| $MgBr_2$ | 0.217% |

The action of various salts in sea water in waste water treatment is complicated. Not only is there an acceleration of sludge sedimentation rate, but there are also enhanced removal effects of Biological Oxygem Demand (BOD) and Chemical Oxygen Demand (COD). Effects on removal of BOD and COD are due to utilization of trace elements in sea water by microorganisms as nutrients, resulting in acceleration of growth of microorganisms and subsequent increased uptake of organic substances in a waste water. Besides the above-mentioned effects, stabilization of operation of aeration tank, settling tank and other treatment apparatus is also indicated as a specific feature of the present invention.

It is not fully resolved at the present stage whether these effects are caused by a single salt in sea water or a combination of more than two salts. According to our experimental results, two or more salts are effective in improving sedimentation characteristics of the sludge and in removal of BOD and COD, and some of them are effective in both functions.

The method described in the present invention can be applied for various waste water treatment processes such as industrial water, waste water, domestic sewage and so on. However, it is preferably applied for treatment plants processing an oil-containing waste water, where introduction of sea water can be made quite easily.

As to an oil-containing waste water, such a waste water can contain such oils as crude oil or fraction thereof such as volatile oil, naphtha, kerosene, light oil, heavy oil and the like, or an individual hydrocarbon thereof.

The present invention is illustrated, but not limited, by the following examples.

EXAMPLE 1

A raw water of a predetermined salt concentration prepared by feeding sea water to a waste water from a petroleum refinery was introduced into an aeration tank (capacity: 1000 m$^3$) at a predetermined flow rate. This raw water was mixed with a predetermined concentration of an activated sludge composed of various organisms. A mixture of the raw water and the activated sludge (which is referred to as "mixture" hereafter) was introduced into a settling tank and then the sludge was sedimented. Subsequently, a supernatant liquid was released from the tank as a treated water.

Treatment conditions and results are shown in Table 2.

EXAMPLE 2

An oil-containing waste water was treated by the same procedure as described in Example 1. Results are shown in Table 3.

Table 2

| Number of Days Treated | (A) Amount of Treated Raw Water (m$^3$/hr) (B) Salt Concentration* (wt. %) | | Raw Water (at Inlet of Aeration Tank) | | Mixture | | Treated Water (at Outlet of Settling Tank) | | COD Removal (%) |
|---|---|---|---|---|---|---|---|---|---|
| | | | pH | COD (ppm) | pH | Concentration Activated Sludge (ppm) | pH | COD (ppm) | |
| 1 | (A) | 75.0 | 7.26 | 38.5 | 6.83 | 3940 | 7.28 | 12.2 | 68.5 |
| | (B) | 0.25 | | | | | | | |
| 3 | (A) | 75.0 | 6.93 | 31.3 | 6.80 | 3770 | 7.09 | 9.6 | 66.0 |
| | (B) | 0.25 | | | | | | | |
| 4 | (A) | 75.0 | 6.40 | 29.5 | 6.53 | 4040 | 6.95 | 7.5 | 72.2 |
| | (B) | 0.32 | | | | | | | |
| 7 | (A) | 67.5 | 6.90 | 36.4 | 6.63 | 3725 | 6.95 | 3.8 | 86.8 |
| | (B) | 0.33 | | | | | | | |
| 8 | (A) | 69.0 | 6.79 | 38.0 | 6.74 | 3700 | 7.14 | 3.5 | 90.6 |
| | (B) | 0.32 | | | | | | | |
| 10 | (A) | 70.5 | 7.37 | 37.9 | 6.81 | 3845 | 7.16 | 3.5 | 90.8 |
| | (B) | 0.38 | | | | | | | |
| 15 | (A) | 67.5 | 7.35 | 31.1 | 6.63 | 3900 | 7.09 | 3.3 | 89.5 |
| | (B) | 0.30 | | | | | | | |

*calculated as NaCl

Table 3

| Number of Days Treated | (A) Amount of Treated Raw Water (m$^3$/hr) (B) Salt Concentration* (wt.%) | | Raw Water (at Inlet of Aeration Tank) | | Mixture | | Treated Water (at Outlet of Settling Tank) | | COD Removal (%) |
|---|---|---|---|---|---|---|---|---|---|
| | | | pH | COD (ppm) | pH | Concentration Activated Sludge (ppm) | pH | COD (ppm) | |
| 1 | (A) | 90.0 | 7.90 | 49.6 | 6.61 | 5125 | 7.69 | 4.5 | 91.0 |
| | (B) | 0.33 | | | | | | | |
| 2 | (A) | 79.5 | 8.00 | 32.2 | 6.73 | 5080 | 7.51 | 3.4 | 89.5 |
| | (B) | 0.26 | | | | | | | |
| 5 | (A) | 54.0 | 7.93 | 47.8 | 6.92 | 6420 | 7.99 | 11.7 | 75.3 |
| | (B) | 0.08 | | | | | | | |
| 6 | (A) | 69.0 | 7.63 | 41.6 | 6.75 | 5900 | 7.64 | 8.9 | 78.5 |
| | (B) | 0.32 | | | | | | | |
| 9 | (A) | 76.5 | 7.45 | 21.9 | 6.74 | 5690 | 7.80 | 7.9 | 64.0 |
| | (B) | 0.15 | | | | | | | |
| 10 | (A) | 78.0 | 7.40 | 11.0 | 6.63 | 5105 | 7.50 | 6.4 | 51.0 |
| | (B) | 0.07 | | | | | | | |

*calculated as NaCl

EXAMPLE 3

Treatment of waste water was made as described in Example 1. The effect of feeding a sea water to the waste water, upon removal rate of BOD, was examined.

Figure 2:
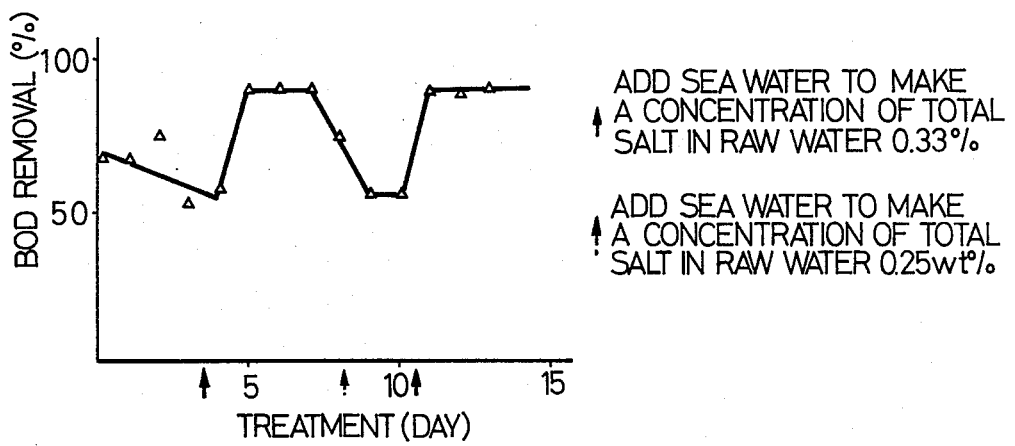
Figure 3:
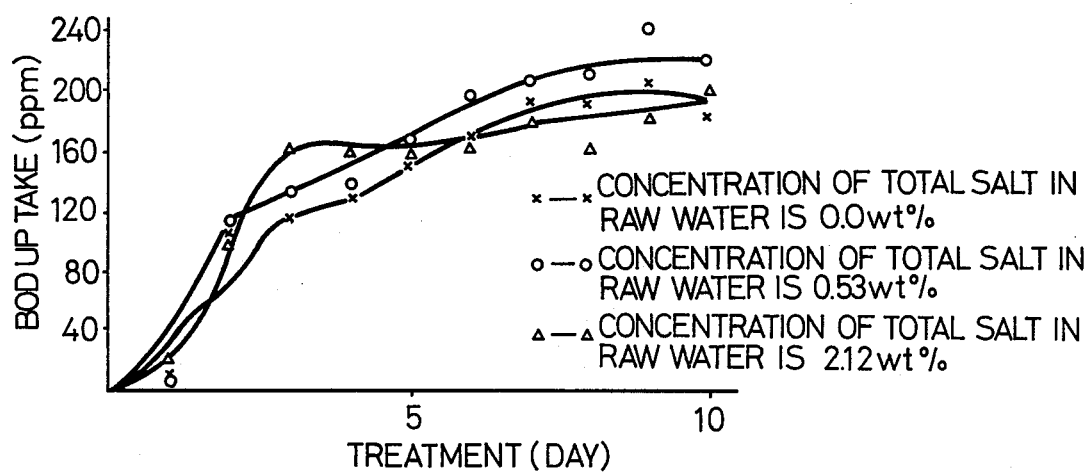
FIG. 3 shows the effect of feeding sea water on uptake rate of BOD by microorganisms.

FIGS. 1 and 2 show changes of removal rate of BOD from the waste water when sea water was added. FIG. 3 shows the effect of sea water to uptake of BOD by microorganisms. It is apparent from this Figure that uptake of BOD was increased by feeding the sea water, and it is especially effective when sea water was fed to make the total salt concentration in the waste water about 0.5 weight percent.

EXAMPLE 4

In this example, sedimentation characteristics of the activated sludge were examined, in the process of waste water treatment by feeding sea water. Table 4 shows sedimentation characteristics compared in various salt concentrations of a mixture of sludge at a concentration of the activated sludge of 5000 ppm. Numerical values in Table 4 indicate volume percent (vol. %) of supernatant liquid to total volume of the mixture measured by settling the mixture in a defined vessel (for example, a graduated cylinder of one liter).

It is apparent from the values in Table 4 that sedimentation of solid materials such as sludge was most efficient when sea water was fed to provide a total salt concentration in waste water of 0.5 weight percent. Further, the time required for sedimentation is shortened considerably.

Table 4

| Salt Concentration (wt. %) | Time (min.) | | | | |
|---|---|---|---|---|---|
| | 2.5 | 5 | 10 | 20 | 30 |
| 0.0 | 52 | 76 | 81 | 84 | 86 |
| 0.52 | 55 | 78 | 83 | 87 | 88 |
| 1.07 | 51 | 76 | 81 | 83 | 86 |
| 1.60 | 50 | 74 | 80 | 83 | 85 |
| 2.12 | 47 | 70 | 78 | 82 | 83 |

EXAMPLE 5

A waste water from a petroleum refinery (salt concentration is 0.25 weight percent calculated as NaCl) was introduced into an aeration tank (capacity: 1000 m$^3$) at a flow rate of 68-75 m$^3$/hr. and was treated by mixing the waste water with an activated sludge composed of various organisms (concentration: about 3900 ppm). The resulting mixture was introduced into a settling tank and the sludge was sedimented. The thus obtained supernatant liquid was released from the tank as a treated water.

The above operation was conducted for a long time period. The BOD of the treated water was measured once a day during the operation.

The removal rate of BOD from the waste water was lowered to about 50% after 4 days. Thus, sea water was fed to a waste water in an amount to increase total salt concentration (calculated as NaCl) in the waste water from 0.25 to 0.33 weight percent. The operation was continued to control the total salt concentration by feeding sea water to the waste water in the aeration tank. The removal rate of BOD in the treated water was again lowered to about 50% after 4.5 days (that is, 8.5 days after initiation of operation). At this state, sea water feeding was stopped. Again, after a lapse of 1.5 days, sea water was added to the waste water in an amount to increase the total salt concentration (calculated as NaCl) in the waste water from 0.25 weight percent to 0.33 weight percent.

The waste water treatment was carried out according to the above-mentioned operations for 30 days. As a result, the average removal rate of BOD was 88.7%. This illustrates the very effective character of the method of this invention.

EXAMPLE 6

A waste water from a petroleum refinery (salt concentration is 0.07 weight percent calculated as NaCl) was introduced into an aeration tank (capacity: 1000 m$^3$) at a flow rate of 78-90 m$^3$/hr., and was treated by mixing the waste water with an activated sludge composed of various organisms (concentrations: about 5200 ppm). The resulting mixture was introduced into a settling tank and the sludge was sedimented. The thus obtained supernatant liquid was released from the tank as a treated water.

The above operation was done for a long time period. The BOD of the treated water was measured once a day during the operation.

Feeding of sea water to the waste water was initiated after 3.5 days and thus total salt concentration in the waste water was increased from 0.07 weight percent to 0.3 weight percent. The operation was continued for 4 days with control of the total salt concentration by feeding sea water.

Feeding of sea water was stopped after 4 days. After 1.5 days lapse (namely, 10th day from the start of the operation), feeding of sea water was resumed, and the total salt concentration (calculated as NaCl) in the waste water was controlled to increase from 0.07 weight percent to 0.3 weight percent and to maintain the latter concentration as a constant value.

Figure 4:
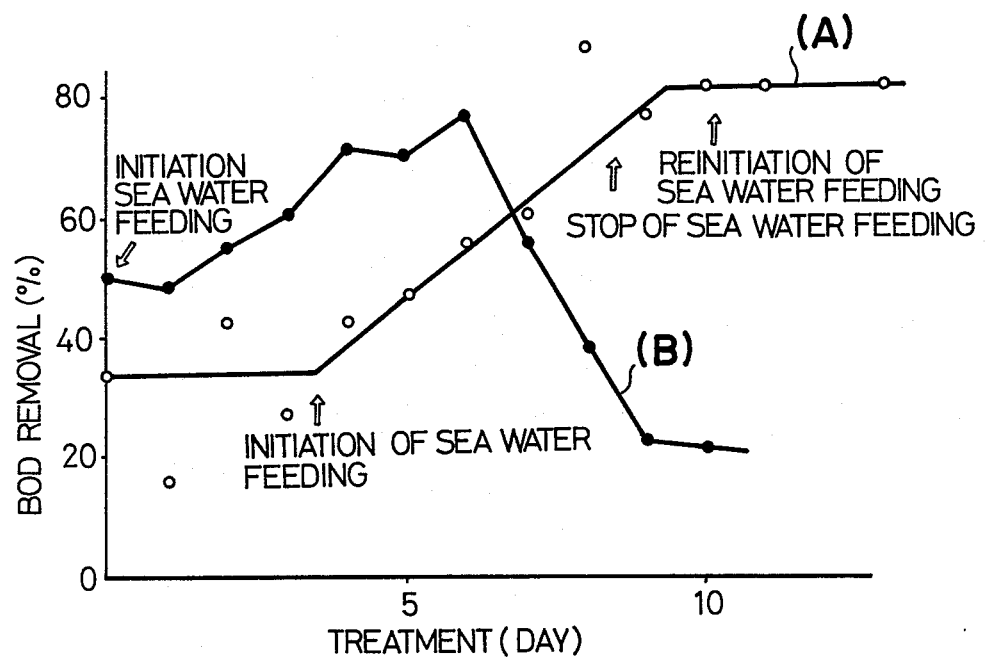
FIG. 4 shows the effect of feeding sea water on removal rate of BOD.

The relation between BOD removal rate and time lapse was shown in FIG. 4 as curve A.

COMPARATIVE EXAMPLE 1

Sea water was fed to a waste water from a petroleum refinery at the start of operations. The total salt concentration was controlled to 0.5 weight percent. This waste water was introduced into an aeration tank (capacity: 1000 m$^3$) at a flow rate of 69-85 m$^3$/hr. and was treated by mixing the waste water with an activated sludge composed of various organisms (concentration: about 4000 ppm). The resulting mixture was introduced into a settling tank and the sludge was sedimented. The thus obtained supernatant liquid was released from the tank as a treated water.

The above operation was done for a long time period. The BOD removal rate was measured once a day during the operation.

Results are shown in FIG. 4 as curve B.

Microorganisms primarily present in the sludges employed in the illustrative examples are zooglea, epistylis and vorticella.

EXAMPLE 7

An oil-containing waste water was treated by the same procedure as described in Example 1. Results are shown in Table 5.

Table 5

| Total Amount of Waste Water and Sea Water (m$^3$/hr) | Added Amount of Sea Water or Paste (m$^3$/hr) | Salt Concentration Calculated as NaCl (wt. %) | Waste Water (at Inlet of Aeration Tank) | |
|---|---|---|---|---|
| | | | pH | COD (ppm) |
| 80 | 5 | 0.22*$^2$ 0.36*$^3$ | 7.50 | 34.3 |

| Mixture Concentration Activated Sludge | | Treated Water (at Outlet of Settling Tank) | | COD Removal (%) | Sedimentation of Sludge*$^1$ (vol. %) |
|---|---|---|---|---|---|
| pH | (ppm) | pH | COD (ppm) | | |
| 6.92 | 4820 | 7.14 | 4.2 | 87.7 | 72 |

*$^1$Sedimentation of sludge was measured after 30 minutes in the manner described in Example 4.
*$^2$Calculated amount
*$^3$Observed amount

COMPARATIVE EXAMPLE 2

An oil-containing waste water was treated by adding a composition consisting of lime, sea water and tar to the waste water. Said composition was prepared according to the description shown at page 2, left column, lines 42–66 of U.S. Pat. No. 191,853. Results are shown in Table 6.

Table 6

| Total Amount of Wast Water and Sea Water ($m^3/hr$) | Added Amount of Paste*1 ($m^3/hr$) | Salt Concentration Calculated as NaCl (wt. %) | Waste Water (at Inlet of Aeration Tank) pH | Waste Water (at Inlet of Aeration Tank) COD (ppm) | Mixture Concentration Activated Sludge pH | Mixture Concentration Activated Sludge COD (ppm) | Treated Water (at Outlet of Settling Tank) pH | Treated Water (at Outlet of Settling Tank) COD (ppm) | COD Removal (%) | Sedimentation of Sludge*2 (vol. %) |
|---|---|---|---|---|---|---|---|---|---|---|
| 80 | 4.8 (67g/liter of Waste Water) | 0.41*3 0.54*4 (0.21)*5 | 7.50 | 34.3 | 6.9 | 4820 | 7.10 | 4.6 | 86.2 | 70 |
| 60 | 4.9 (93.5g/liter of Waste Water) | 0.55*3 0.67*4 (0.28)*5 | 7.81 | 36.5 | 7.0 | 3680 | 7.20 | 4.4 | 87.9 | 65 |

*1Paste of lime, tar and sea water was prepared by slaking 100 weight parts of lime with 100 weight parts of sea water, adding 5 weight parts of tar to the lime when hottest to form a paste and dissolving (or diluted) one weight part of the paste in (or with) 15 weight parts of sea water, and the paste was used.
*2Sedimentation of sludge was measured after 30 minutes in the manner described in Example 4.
*3Calculated amount
*4Observed amount
*5Concentration of salt resulted from sea water.

What is claimed is:

1. In a method for treating an oil-containing waste water with an activated sludge in an aeration tank, wherein the waste water is passed into the aeration tank at a rate of from about 50 to about 140 $m^3/hr$. per 1000 $m^3$ of the capacity of the aeration tank and wherein the concentration of the activated sludge in the aeration tank is from about 1000 to 8000 ppm, followed by sedimentation of the waste water and the activated sludge in a settling tank, the improvement which comprises adding to said waste water a treating agent consisting of a sea water to maintain therein a salt concentration (calculated as NaCl) of from about 0.3 to about 0.5 weight percent, to accelerate sludge sedimentation rate and to improve BOD and COD removal.

2. The method of claim 1, wherein the sea water is added continuously to said waste water to maintain said salt concentration and regulating the addition of the sea water by decreasing the said addition when removal rate of biological oxygen demand in the treated water decreases and by increasing the said addition when the salt concentration in the waste water is up to one-half of the salt concentration at a steady state of the treatment.

3. The method of claim 1, wherein the sea water is added to the waste water before the waste water is passed to the aeration tank.

4. The method of claim 1, wherein the sea water is added to the waste water as the waste water is passed to the aeration tank.

5. The method of claim 1, wherein the sea water is added to the aeration tank.

6. The method of claim 1, wherein the sea water is added continuously.

7. The method of claim 1, wherein substantially equal amounts of the sea water are added intermittently.

8. The method of claim 1, wherein varying amounts of the sea water are added intermittently.